Figure 1:
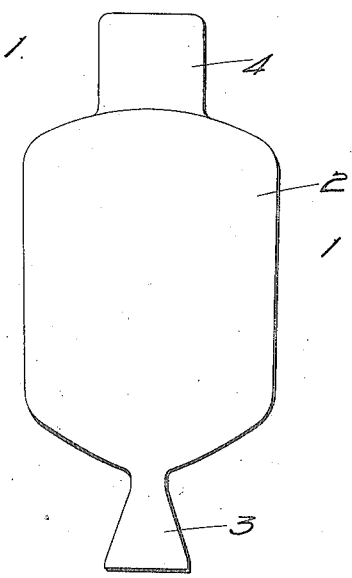

H. F. MITZEL.
DIPPED RUBBER HOT WATER BOTTLE AND METHOD OF MAKING.
APPLICATION FILED JULY 6, 1915.

1,208,615.

Patented Dec. 12, 1916.

INVENTOR:
Harry F. Mitzel
by his attorneys

H. F. MITZEL.
DIPPED RUBBER HOT WATER BOTTLE AND METHOD OF MAKING.
APPLICATION FILED JULY 6, 1915.
1,208,615.
Patented Dec. 12, 1916.
2 SHEETS—SHEET 2.
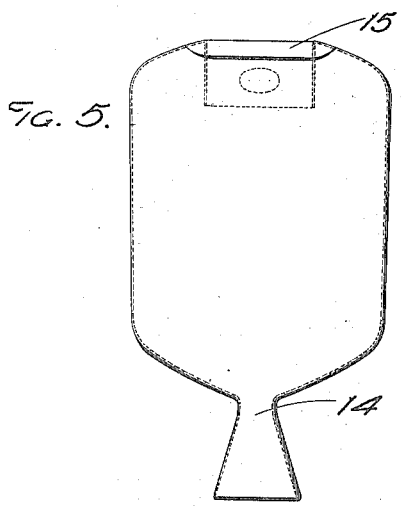
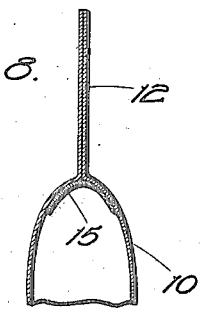
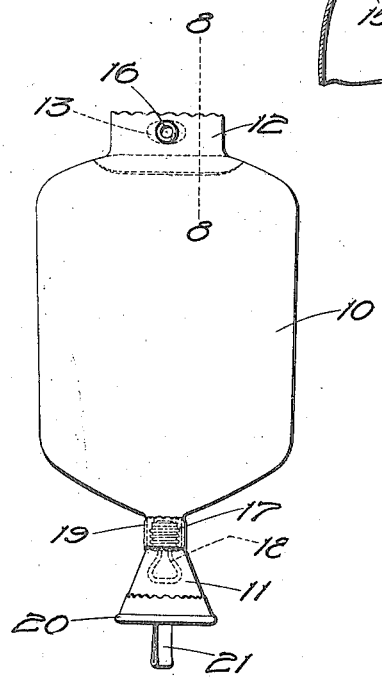
INVENTOR:
Harry F. Mitzel
by his attorneys
Phillips, Van Ettern & Fish

UNITED STATES PATENT OFFICE.

HARVEY F. MITZEL, OF BOSTON, MASSACHUSETTS, ASSIGNOR OF ONE-HALF TO WILLIAM M. ROSE, OF HYDE PARK, BOSTON, MASSACHUSETTS.

DIPPED RUBBER HOT-WATER BOTTLE AND METHOD OF MAKING.

1,208,615.   Specification of Letters Patent.   Patented Dec. 12, 1916.

Application filed July 6, 1915. Serial No. 38,199.

*To all whom it may concern:*

Be it known that I, HARVEY F. MITZEL, a citizen of the United States, residing at Roslindale, Boston, in the county of Suffolk and State of Massachusetts, have invented certain new and useful Improvements in Dipped Rubber Hot-Water Bottles and Methods of Making; and I do hereby declare the following to be a full, clear, and exact description of the invention, such as will enable others skilled in the art to which it appertains to make and use the same.

The present invention relates to hot water bottles and more particularly to a dipped rubber hot water bottle and to the method of making such bottle.

According to the present invention the hot water bottle is formed by the well-known dipping process in which a form is repeatedly dipped into a solution of rubber in a volatile solvent and dried, until a sufficiently thick coating of rubber is formed on the form. Each time the bottle is dipped, a thin layer of rubber is deposited so that the entire coating is formed of a large number of separately deposited layers or laminæ of rubber. A bottle thus built up of a large number of separately deposited layers of rubber is much more resilient and stronger in proportion to its weight than the usual molded bottle.

In making dipped hot water bottles, it has been proposed to make a large neck on the bottle to permit the form to be withdrawn, and to afterward close the neck with a partial soft rubber closure in which is received the usual stopper. This not only involves putting in a separate piece of soft rubber for closure, but also makes a large and unsightly neck on the bottle. It has also been proposed to make a dipped hot water bottle on a form having recesses or grooves in the side edges thereof in which the rubber was deposited during the dipping process. The finished bag, when empty, retains the shape of the form, but when full, the hollows in the side are pushed out by the contained water to form the usual shaped bag. The form used in this method could be made narrow enough to be withdrawn through the neck of the bottle. This method, however, was open to the objection, among other things, that during vulcanization, which usually is had by dipping the bottle in a vulcanizing solution, the vulcanizing solution remained longer in the folded-in portions of the bag and resulted in unequal vulcanization and weak spots in the bag.

The object of the present invention is to produce a bottle having the superior qualities of a dipped bottle but without the disadvantages attendant to dipped hot water bottles as heretofore made.

With this object in view, the invention consists in the dipped hot water bottle and the method of making the same hereinafter described and particularly pointed out in the claims.

Figure 2:
Figure 3:
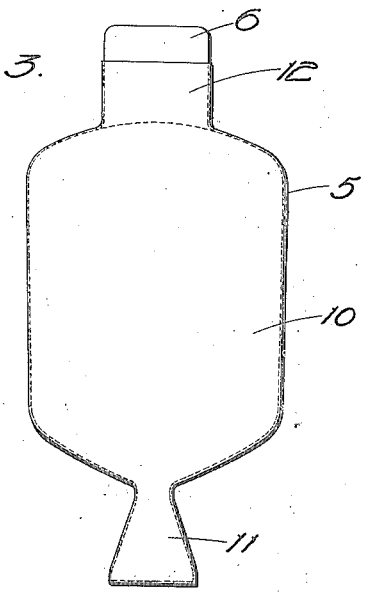
Figure 4:
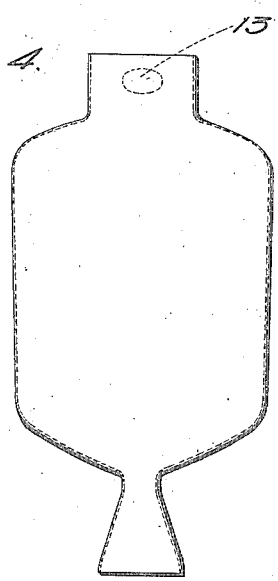

In the drawings which illustrate the preferred way of carrying out the method and the preferred embodiment of the article, Figure 1 is a front view showing the form for making the bottle; Fig. 2 is a side elevation of the form; Fig. 3 illustrates the form after dipping in the rubber solution to form the bottle shell; Fig. 4 is a view of the rubber shell stripped from the form; Fig. 5 is a view of the shell turned inside out and Fig. 6 is a top plan view of the shell turned inside out; Fig. 7 is an elevation of the completed bottle and Fig. 8 is a section on the line 8—8 of Fig. 7.

Referring to the illustrated embodiment of the invention, the form 1 is of substantially the same shape as that desired for the completed bottle, having a flat extended body portion 2, a funnel-shaped neck portion 3, and a thin flat bottom extension 4 (the form 1 being illustrated upside down). The form is repeatedly dipped in a solution of rubber in a volatile solvent and dried according to the well known dipping process to form a coating or shell 5 of rubber on the form. The upper portion 6 of the bottom extension 4 can be conveniently used as a handle during the dipping. The shell or coating deposited on the form has a flat extended body portion 10, a funnel-shaped neck portion 11 (the end of which is closed) and a bottom extension 12. The width of the bottom extension 12 is about one third the width of the body portion 10. After the shell or coating is formed as illustrated in Fig. 3, it is vulcanized on the form, preferably by dipping in a vulcanizing solution to vulcanize the rubber by the well known "acid cure". The rubber shell is allowed to remain in the vulcanizing solution long enough to vulcanize the outer surface of the rubber, but preferably not long enough to completely vulcanize the inner surface of the rubber; the vulcanizing solution penetrating far enough into the rubber to nearly or semi-vulcanize the main body of the rubber. The rubber shell is sufficiently resilient so that it is removed from the form 1 by stretching the bottom extension 12 and drawing it over the body portion 2 of the form. After the shell is removed, the bottom extension 12 is sealed by applying a rubber cement to its inside and pressing the opposite walls together. It is to be remembered that the inside surface is not completely vulcanized so that the surfaces to be united are not vulcanized surfaces. Then after sticking the inside surfaces together with cement, the outside of the bottom extension is brushed over with a vulcanizing solution which penetrates through the rubber and firmly vulcanizes together the inner surfaces of the bottom extension. The bottom extension has continuous walls throughout its length, the opening through which the form 1 is withdrawn being at the very end of the bottom extension. This open-ended bottom extension with its continuous walls vulcanized together throughout the entire length of the extensions makes a very secure and strong closure for the bottom of the bottle. Before the bottom extension 12 is sealed, a piece of reinforcing fabric 13 is placed inside to be vulcanized in place. Unless previously done, the flat outer end of the funnel portion 11 is next cut off so as to leave the enlarged end of the funnel 11 open. The shell is turned inside out by drawing the body through the neck 14. The body portion, because of its lightness and flexibility, can be easily drawn through the neck 14, which, although small, is sufficiently resilient to stretch for the body portion to be drawn through it. This exposes the inner unvulcanized or incompletely-vulcanized surface of the bottle. A sheet of unvulcanized rubber 15 is laid over the inner mouth of the bottom extension as shown in Figs. 5 and 6 and secured in place by rubber cement. As shown in Fig. 6, the edges of the piece of rubber 15 extend along the inner surface of the bottle to some distance from the inner mouth of the bottom extension. This forms what may be called a lock seam in the completed bottle, because the pressure of the water will not tend to separate the piece 15 from the inner mouth of the bottom extension, but will press it more firmly against it. After the lock seam piece 15 is applied, the shell, (still turned inside out) is dipped in a vulcanizing solution to vulcanize the inner surface of the bottle and to complete the vulcanization of the central layers of the coating of the shell. This vulcanizing process also serves to vulcanize the lock seam piece 15 securely to the body of the shell. Next, the shell is turned right side out by drawing the body portion through the contracted neck 14. The shell is then finished to form the completed hot water bottle which goes to the customer. A gromet 16 is inserted through the bottom extension 12 and its contained piece of reinforcing fabric 13. A nozzle 17 for the threaded stopper 18 is put in the contracted portion of the neck which is wired around it. Then a finishing strip 19 is cemented around the neck. A finishing strip 20 and loop 21 are secured to the funnel-shaped neck.

The completed bottle has the flexibility and strength of a dipped rubber bottle and has the security against leaking that an entirely seamless bottle has. The bottom extension 12 has its sides united throughout its entire length from its inner to its outer mouth and these sides are broken only where the small gromet 16 is inserted. Since the closure of the bottom extension is had by cementing and then vulcanizing together the walls of the bottom extension, a strong, as well as impervious closure is formed. In addition to the closure thus formed by the bottom extension, the lock seam strip 15 which, as shown in Fig. 8, is vulcanized over the inner mouth of the bottom extension, makes the bottom extension closure still stronger, the vulcanization serving to conform the strip to its seat and integrally uniting the rubber so that, for all practical purposes, the bottom of the bottle has all the security against leakage that an absolutely seamless bottle might have. The bottle is light and flexible throughout. No stiff or reinforcing pieces are needed to complete the closure at the bottom of the bottle. The edges of the bottle are of the same thickness of rubber as the rest of the bottle and no stiff bead is present around the edges or bottom of the bottle as with the usual molded bottle.

While the preferred embodiment of the invention and preferred manner of carrying out the method have been specifically illustrated and described, it is understood that the invention is not limited to all of the described details but may be carried out within the scope of the following claims.

I claim—

1. The method of making a dipped rubber hot water bottle which consists in repeatedly immersing a form having a flat extended body portion, a funnel-shaped neck portion and a bottom extension, in a rubber solution and allowing it to dry to form a continuous seamless laminated shell or coating of rubber having a flat body, a funnel-shaped neck and a sleeve-like bottom extension, in vulcanizing the shell on the form, in removing the vulcanized shell by stretching the bottom extension and drawing it over the form, in uniting the opposite walls of the sleeve-like bottom extension to close it, and in finishing the bottle.

2. The method of making a dipped rubber hot water bottle which consists in repeatedly immersing a form having a flat extended body portion, a funnel-shaped neck portion, and a bottom extension, in a rubber solution and allowing it to dry to form a continuous seamless laminated shell or coating of rubber having a flat body, a funnel-shaped neck and a sleeve-like bottom extension, in vulcanizing the shell on the form, in removing the vulcanized shell by stretching the bottom extension and drawing it over the form, in uniting the opposite walls of the bottom extension to close it, in turning the shell inside out and applying a sheet of rubber to the inside of the shell over the mouth of the bottom extension to form a lock seam, in turning the shell right side out, and in finishing the bottle.

3. The method of making a dipped rubber hot water bottle which consists in repeatedly immersing a form having an extended flat body portion and a funnel-shaped neck portion and a bottom extension, in a rubber solution and allowing it to dry to form a continuous seamless laminated shell or coating of rubber, having a flat body, a funnel-shaped neck and a sleevelike bottom extension, in vulcanizing the shell on the form, in removing the shell by stretching the bottom extension and drawing it over the form, in putting a sheet of reinforcing material in the bottom extension, in uniting the opposite walls of the bottom extension to close it, in turning the shell inside out and applying a sheet of rubber to the inside of the shell over the inner mouth of the bottom extension to form a lock seam, in turning the shell right side out, in inserting a gromet through the bottom extension and contained reinforcing material, and in finishing the bottle.

4. The method of making a dipped rubber hot water bottle which consists in repeatedly immersing a form having an extended flat body portion and a funnel-shaped neck portion and a bottom extension, in a rubber solution and allowing it to dry to form a continuous seamless laminated shell or coating of rubber having a flat body, a funnel-shaped neck and a sleevelike bottom extension, in vulcanizing the outer surface of the shell on the form leaving the inner surface un- or incompletely-vulcanized, in removing the thus vulcanized shell by stretching the bottom extension and drawing it over the form, in uniting the opposite walls of the bottom extension to close it, in turning the shell inside out, and in vulcanizing the inner surface of the shell, and in turning the shell right side out and finishing it.

5. The method of making a dipped rubber hot water bottle which consists in repeatedly immersing a form having an extended flat body portion, a funnel-shaped neck portion and a flat bottom extension, in a rubber solution and allowing it to dry to form a continuous seamless laminated shell or coating of rubber having a flat body, a funnel-shaped neck and sleevelike bottom extension, in vulcanizing the outer surface of the shell on the form leaving the inner surface un- or incompletely-vulcanized, in removing the thus vulcanized shell by stretching the bottom extension and drawing it over the form, in uniting the opposite walls of the bottom extension to close it, in turning the shell inside out and applying a sheet of rubber to the inside of the shell over the inner mouth of the bottom extension to form a lock seam, in vulcanizing the inner surface of the shell and vulcanizing the rubber sheet to the inside of the shell, in turning the shell right side out and finishing it.

6. The method of making a dipped rubber hot water bottle which consists in repeatedly immersing a form having an extended flat body portion, a funnel-shaped neck portion and a bottom extension, in a rubber solution and allowing it to dry to form a continuous seamless laminated shell or coating of rubber having a flat body, a funnel-shaped neck and sleevelike bottom extension, in dipping the shell in a vulcanizing solution to vulcanize its outer surface leaving the inner surface un- or incompletely-vulcanized, in removing the vulcanized shell by stretching the bottom extension and drawing it over the form, in cementing the inside of the bottom extension and pressing the walls together, in applying a vulcanizing solution to the outside of the bottom extension to penetrate the walls of the bottom extension and vulcanize the walls thereof together, in turning the shell inside out and cementing a sheet of rubber to the inside of the shell over the inner mouth of the bottom extension to form a lock seam, in dipping the inside-out shell in a vulcanizing solution to vulcanize the inner surface of the shell and to vulcanize the sheet over the mouth of the bottom extension, and in turning the shell right side out and finishing it.

7. The method of making a dipped rubber hot water bottle which consists in repeatedly immersing a form having an extended flat body portion, a funnel-shaped neck portion and a bottom extension, in a rubber solution and allowing it to dry to form a continuous seamless laminated shell or coating of rubber having a flat body, a funnel shaped neck and a sleevelike bottom extension, in dipping the shell in a vulcanizing solution to vulcanize its outer surface and leaving the inner surface un- or incompletely-vulcanized, in removing the vulcanized shell by stretching the bottom extension and drawing it over the form, in inserting a sheet of reinforcing material in the bottom extension, in cementing the inner walls of the bottom extension together with the reinforcing material between them, in cementing the inside of the bottom extension and pressing the walls together, in applying a vulcanizing solution to the outside of the bottom extension to penetrate the walls of the bottom extension and vulcanize the rubber cement therein, in turning the shell inside out and cementing a sheet of rubber to the inside of the shell over the inner mouth of the bottom extension to form a lock seam, in dipping the inside-out-shell in a vulcanizing solution to vulcanize the sheet over the mouth of the bottom extension, in inserting a gromet through the bottom extension and contained reinforcing material, and in finishing the bottle.

8. The method of making a dipped rubber hot water bottle comprising, repeatedly immersing a form having a flat extended body portion, a funnel-shaped neck portion and a bottom extension, in a rubber solution and allowing it to dry to form a continuous seamless laminated shell or coating of rubber having a flat body, a funnel-shaped neck and a sleevelike bottom extension, removing the shell by stretching the bottom extension and drawing it over the form, and vulcanizing together the opposite walls of the bottom extension to close it.

9. The method of making a dipped rubber hot water bottle comprising, repeatedly immersing a form having a flat extended body portion, a funnel-shaped neck portion and a bottom extension, in a rubber solution and allowing it to dry to form a continuous seamless laminated shell or coating of rubber having a flat body, a funnel-shaped neck and a sleevelike bottom extension, removing the shell by stretching the bottom extension and drawing it over the form, vulcanizing together the opposite walls of the bottom extension to close it, and in applying and vulcanizing in place a strip of rubber over the inner mouth of the bottom extension to form a lock seam.

10. A dipped rubber hot water bottle comprising a body formed of a single piece of rubber having a seamless top and sides and having the body continued to form an open-ended sleevelike bottom extension, the opposite walls of which are united throughout the length of the extension to close the bottom of the bottle.

11. A dipped rubber hot water bottle comprising a body formed of a single piece of rubber having a seamless top and sides and having the body continued to form an open-ended sleevelike bottom extension, the opposite walls of which are united throughout the length of the extension to close it, and a sheet of rubber laid flat against and united to the inside of the bottle to cover the inner mouth of the extension, the edges of said sheet extending along the inside of the bottle at some distance from the mouth of the extension to form a lock seam.

12. A dipped rubber hot water bottle comprising a body formed of a single piece of rubber of substantially the same thickness throughout, having seamless top and sides, and having the body continued at the bottom to form a sleevelike bottom extension, the walls of which are united throughout the length of the bottom extension to close it, the walls of the bottom extension being of the same thickness throughout as the walls of the body portion of the bottle.

HARVEY F. MITZEL.